(12) United States Patent
Qin et al.

(10) Patent No.: US 8,116,058 B2
(45) Date of Patent: *Feb. 14, 2012

(54) SIGNAL DISTRIBUTION AND SURGE DETECTION AND PROTECTION MODULE AND METHOD

(75) Inventors: Youming Qin, Sunnyvale, CA (US); Frank S. Matsumoto, San Ramon, CA (US); David C. M. Pham, Fremont, CA (US)

(73) Assignee: Harris Stratex Networks Operating Corporation, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,221

(22) Filed: Jul. 6, 2010

(65) Prior Publication Data

US 2010/0265626 A1 Oct. 21, 2010

Related U.S. Application Data

(63) Continuation of application No. 11/542,373, filed on Oct. 2, 2006, now Pat. No. 7,751,169.

(51) Int. Cl.
*H01C 7/12* (2006.01)
(52) U.S. Cl. ........................ 361/119; 361/111
(58) Field of Classification Search .................. 361/111, 361/119
See application file for complete search history.

(56) References Cited

U.S. PATENT DOCUMENTS

| | | | |
|---|---|---|---|
| 2,404,999 A | 7/1946 | Wallace | |
| 2,789,254 A | 4/1957 | Bodie et al. | |
| 3,353,066 A | 11/1967 | de Souza | |
| 3,480,832 A | 11/1969 | Person | |
| 3,750,053 A | 7/1973 | Le Donne | |
| 3,793,535 A | 2/1974 | Chowdhuri | |
| 3,824,431 A | 7/1974 | Schlicke | |
| 3,831,110 A | 8/1974 | Eastman | |
| 3,934,175 A | 1/1976 | Clark | |
| 3,975,664 A | 8/1976 | Baumbach | |
| 4,021,759 A | 5/1977 | Campi | |
| 4,023,071 A | 5/1977 | Fussell | |
| 4,554,608 A | 11/1985 | Block | |
| 4,586,104 A | 4/1986 | Standler | |
| 4,630,163 A | 12/1986 | Cooper et al. | |

(Continued)

FOREIGN PATENT DOCUMENTS

EP 1303004 A2 4/2003

(Continued)

OTHER PUBLICATIONS

Supplemental European Search Report of European patent application No. EP 07853613.3, dated Nov. 24, 2010, 7 pages.

(Continued)

*Primary Examiner* — Jared Fureman
*Assistant Examiner* — Terrence Willoughby
(74) *Attorney, Agent, or Firm* — Sheppard Mullin Richter & Hampton LLP

(57) ABSTRACT

The present invention contemplates systems and methods for distributing RF and DC signals and detecting, logging and suppressing surge energy associated with surge events such as lightning and power line surges. The detection and logging is provided in order to determine possible causes of a failure and who might be responsible for the repair. The suppression is provided in order to protect electrical equipment such as split mount wireless radio systems from catastrophic failure due to surge events.

20 Claims, 5 Drawing Sheets

U.S. PATENT DOCUMENTS

| | | | |
|---|---|---|---|
| 4,706,016 | A | 11/1987 | Schweitzer, Jr. |
| 4,729,055 | A | 3/1988 | Dorival et al. |
| 4,748,534 | A | 5/1988 | Palm |
| 4,845,580 | A | 7/1989 | Kitchens |
| 4,887,180 | A | 12/1989 | Climent et al. |
| 4,901,369 | A | 2/1990 | Momose et al. |
| 4,907,120 | A | 3/1990 | Kaczmarek et al. |
| 5,021,734 | A | 6/1991 | Tuttle |
| 5,122,921 | A | 6/1992 | Koss |
| 5,307,459 | A | 4/1994 | Petersen et al. |
| 5,493,469 | A | 2/1996 | Lace |
| 5,621,602 | A | 4/1997 | Winkelmann |
| 5,625,521 | A | 4/1997 | Luu |
| 5,781,844 | A | 7/1998 | Spriester et al. |
| 5,841,620 | A | 11/1998 | Masghati |
| 5,896,265 | A | 4/1999 | Glaser et al. |
| 5,909,349 | A | 6/1999 | Brower et al. |
| 5,953,194 | A | 9/1999 | Atkins |
| 5,966,283 | A | 10/1999 | Glaser et al. |
| 6,054,905 | A | 4/2000 | Gresko |
| 6,112,136 | A | 8/2000 | Paul et al. |
| 6,137,352 | A | 10/2000 | Germann |
| 6,175,165 | B1 | 1/2001 | Lam |
| 6,452,373 | B2 | 9/2002 | Medelius et al. |
| 6,539,031 | B1 | 3/2003 | Ngoc et al. |
| 6,563,926 | B1 | 5/2003 | Pistilli |
| 6,639,538 | B1 * | 10/2003 | Sechi et al. ............ 341/155 |
| 6,775,121 | B1 | 8/2004 | Chaudhry |
| 6,785,110 | B2 * | 8/2004 | Bartel et al. ............ 361/119 |
| 6,957,047 | B1 | 10/2005 | Young et al. |
| 2001/0024115 | A1 | 9/2001 | Medelius et al. |
| 2003/0152140 | A1 | 8/2003 | Antoniak |
| 2004/0095703 | A1 | 5/2004 | Montena |
| 2004/0264087 | A1 | 12/2004 | Bishop |
| 2005/0048993 | A1 | 3/2005 | Ammar et al. |

FOREIGN PATENT DOCUMENTS

| | | |
|---|---|---|
| EP | 1303004 A3 | 10/2004 |
| WO | 2004054061 A1 | 6/2004 |

OTHER PUBLICATIONS

Polyphase Engineered Controls—Products, "Industrial Control Panel Manufacture For OEMs," http://www.polyphasecontrols.com/pages/products.html, Sep. 8, 2006, 4 pages.

Primary Surge Detection Device, "The Flying Lead Primary Surge Protection Device,"Rail Electrical Products, 1 page.

Silicon Avalanche Diodes, "RoHS 5KP Series," www.littlefuse.com, pp. 298-301.

Epcos, "Surge Arrester, 3-Electrode-Arrester," AB E/AB PM, Issue 03, Aug. 5, 2002, 2 pages.

MDE Semiconductor, Inc., "Metal Oxide Varistors, Standard D Series 20 mm Disc," www.mdesemiconductor.com, 1 page.

Office Action mailed Apr. 16, 2008 from U.S. Appl. No. 11/542,373, filed Oct. 2, 2006.

Office Action mailed Feb. 4, 2009 from U.S. Appl. No. 11/542,373, filed Oct. 2, 2006.

The Art of Electronics, 2nd Edition, Authors Paul Horowitz and Winfield Hill, Cambridge University Press 1980, 1989.

Search Report and Written Opinion mailed Nov. 21, 2008 from International Serial No. PCT/US2007/079330 filed Sep. 24, 2007.

Office Action mailed Sep. 17, 2009 from U.S. Appl. No. 11/542,373, filed Oct. 2, 2006.

Notice of Allowance mailed Feb. 26, 2010 from U.S. Appl. No. 11/542,373, filed Oct. 2, 2006.

* cited by examiner

SIGNAL DISTRIBUTION AND SURGE DETECTION AND PROTECTION MODULE AND METHOD

CROSS-REFERENCE TO RELATED APPLICATION

The present application is a continuation of and claims benefit to U.S. Nonprovisional patent application Ser. No. 11/542,373 filed Oct. 2, 2006, now U.S. Pat. No. 7,751,169 entitled "Signal Distribution and Surge Detection and Protection Module and Method" which is incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention is generally related to surge protection and, more specifically, to systems and methods for signal distribution and surge detection and protection in various systems including split mount wireless radio systems.

BACKGROUND

Surge protection circuits are designed to protect electronic equipment from damage due to surge events that may cause large transient over voltage or current spike. Surge events may result from lightning strikes, switching impulses, electrical line noise, and other transients or abnormal conditions and malfunctions. For example, a lightning strike may cause a surge of 20 kV that can destroy equipment absent surge protection to prevent such destruction. Surge protection can block surges before they reach the electronic equipment by limiting the voltage, diverting the current through an alternate signal path, or both.

Examples of surge protectors include primary and secondary protection devices. Generally, a primary protection device is one that typically controls the electric power service entrance, operating as a main disconnect, and a secondary protection device can be connected upstream or downstream of the main disconnect. Surge protection devices may be constructed using fuses, inductors, clamping devices such as metal oxide varistors (MOVs), zener diodes, gas tubes, or various combinations of such devices as well as others.

Different systems may require different protection measures and possibly different types of surge protection mechanisms. Among such systems are wireless communication or wireless radio systems that can be configured as point-to-point, point-to-multipoint, and mesh networks consisting of multiple terminals. In some wireless communication systems each terminal or node includes digital and analog transceiver portions. The analog portion can include IF (intermediate frequency) and RF (radio frequency) content. With a split mount configuration, each node has an indoor unit (IDU) and an outdoor unit (ODU). The IDU connects to the network (e.g., Ethernet or Internet networks) and the ODU connected to an antenna. In this case, the IDU has a power supply and a modem or network interface and the ODU has an RF transceiver. The IDU can supply to the ODU DC power and modulated IF signals for transmission and it can receive from the ODU modulated IF signals received from the antenna. To this end, the IDU and ODU have an up-down connection between them using coaxial cable that can carry both power and IF signals (i.e., DC and non-DC signals).

In split mount systems such as the aforementioned wireless radio systems, both the ODU and IDU may need protection from surge events. Under regulatory guidelines, the IDU typically requires primary surge protection, i.e., at the power service entrance and at a coaxial cable connection point. Under such guidelines, the surge protection of the ODU can be provided inside or outside the ODU housing and it can be primary or secondary. In the ODU, internal surge suppression circuits provide only secondary protection and external surge arrestors may be costly and require a separate housing. An external surge arrestor is typically sealed from the environment and needs to be properly grounded.

Failures may occur, however, even with protection mechanisms as described above. For example, in split mount systems the up-down cable connectors may admit surge energy to components inside the wireless radio system and represent a vulnerable point in such systems. Thus, when there is a failure the system manufacturer (e.g., ODU and IDU manufacturer) may be required to perform a warranty repair without necessarily knowing whether the failure is due to a surge event, an inappropriate installation or another cause. There is therefore also a need to detect and better determine the causes of such malfunctions in order to determine, for instance, who might be responsible for the repair.

SUMMARY

In view of the foregoing, various embodiments of the present invention include distributing RF, DC, and surge components of a signal and detecting, suppressing, and logging surge events. The following outlines some examples of systems and methods for performing these functions.

In accordance with one embodiment, a system for distributing signals and for detecting, suppressing and recording surge events, comprises: an RF (radio frequency) path; a DC (direct current) path inductively coupled to the RF path; and a surge protection and detection component. The surge protection and detection component comprises a surge protection component with one or more clamping devices operatively linked between the DC path and ground to clamp surge energy associated with a surge event, and a surge detector operatively linked to the RF path from which it receives an attenuated surge energy associated with such surge event, wherein the surge detector is adapted to provide indicia of the of the surge event for the purpose of logging it for future reference.

Such system may further comprise a processor and a memory operatively connected for processing and logging the indicia from the surge detector; and it may also include a display, recording or printing device operatively connected to the processor and adapted to receive from the processor information associated with surge events. The information would preferably represent logged surge events, and may represent also current surge events, or both.

In such system the RF path, DC path and surge protection and detection component may be implemented together in a signal distribution and protection module (SDPM). The SDPM may be adapted to suppress, detect and provide the indicia of surge events resulting from lightning surges or power surges, wherein the indicial is in the form of digital information. The RF path includes an RF matching network with impedance matching inductors. The RF matching network includes a DC blocker connected on each of its ends to an inductor. The RF path may include also two RF connectors with the RF matching network interposed between them.

The DC path is inductively coupled to the RF path via an inductor adapted to allow DC and low-frequency signal components to reach the DC path and to prevent passage to the DC path of higher frequency components. The DC path is inductively coupled to the RF path via another inductor adapted to allow a portion of low frequency surge energy to reach the RF path bypassing the DC blocker.

The surge detector is adapted to sample power surge energy and lightning surge energy. The surge detector comprises a sampler and an analog-to-digital converter (ADC) adapted to receive signals from the sampler. The surge detector further comprises a buffer operatively interposed between the sampler and the ADC.

In the exemplary system, the clamping devices include any combination of a gas tube, a metal oxide varistor, and a zener diode. Such clamping devices are adapted to react to a surge event is a predetermined order. Surge events are typically associated with a lightning strike, a power surge, or electrical noise. Moreover, the surge protection component may further include one or more capacitors each of which being connected across one of the clamping devices. The DC path includes an inductor interposed between each pair of clamping devices. Furthermore, the DC path includes a power supply connector in series with the inductors.

A system according to another embodiment of the invention comprises a surge detection and protection module (SDPM) including: an RF path, a DC path inductively coupled to the RF path, a surge protection component operatively coupled between the DC path and ground and adapted to suppress surge energy associated with surge events, and a surge detector adapted to provide indicia of surge events. Such system further includes a processor operatively coupled to the surge detector and adapted to receive and process the indicia in order to manage a log of surge events; a memory adapted to maintain the log of surge events; and an output device operatively coupled to the processor and adapted for one or more of transmitting, printing and displaying information associated with surge events. In this system, the surge detector receives at least a portion of the surge energy via a connection to the RF path, wherein the DC path is adapted to carry DC and low frequency signal components while the RF path includes an RF matching network adapted to carry higher frequency signal components, and wherein low frequency signal components bypass the RF matching network reaching the connection to the RF path via the DC path and the inductive coupling between the DC path and RF path.

In accordance with yet another embodiment, a system may further comprise an indoor unit (IDU), an outdoor unit (ODU) and a cable connecting between the IDU and ODU, wherein the IDU, ODU, or both, has an SDPM associated therewith. The ODU includes a transceiver operatively connected to the RF path, wherein the RF path is adapted to carry IF (intermediate frequency) signal components to and from the transceiver and wherein the transceiver is adapted to wirelessly transmit and receive microwave signals associated with the IF signal components.

In accordance with the purpose of the invention as embodies and broadly described herein, a method for distributing signals and for detecting, suppressing and recording surge events, comprises the steps of: providing an RF path; providing a DC path inductively coupled to the RF path; and providing a surge protection and detection device including: providing a surge protection component with one or more clamping devices operatively linked between the DC path and ground to clamp surge energy associated with a surge event, and providing a surge detector operatively linked to the RF path from which it receives an attenuated surge energy associated with such surge event, wherein the surge detector is adapted to provide indicia of the surge event for the purpose of logging it for future reference. This method further comprises the step of providing a processor adapted to manage a log of surge events based on the indicia from the surge detector.

Further in accordance with the purpose of the invention another embodiment of a method for distributing signals and for detecting, suppressing and recording surge events, comprising the steps of: receiving a signal including an RF component, a DC component, and a surge component associated with a surge event; propagating the RF component through an RF path while blocking the DC component from the RF path; propagating the DC component through a DC path, wherein the DC path is inductively coupled to the RF path; propagating the surge component through the DC path which includes one or more clamping devices operatively linked ground, and clamping the surge component at the one or more clamping devices; and detecting a residue of the surge component and based thereon logging the surge event.

These and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION

In the following detailed description, reference is made to the accompanying drawings in which are shown by way of illustration a number of embodiments and the manner of practicing the invention. It is to be understood that other embodiments may be utilized and structural changes may be made without departing from the scope of the present invention.

Figure 1A:
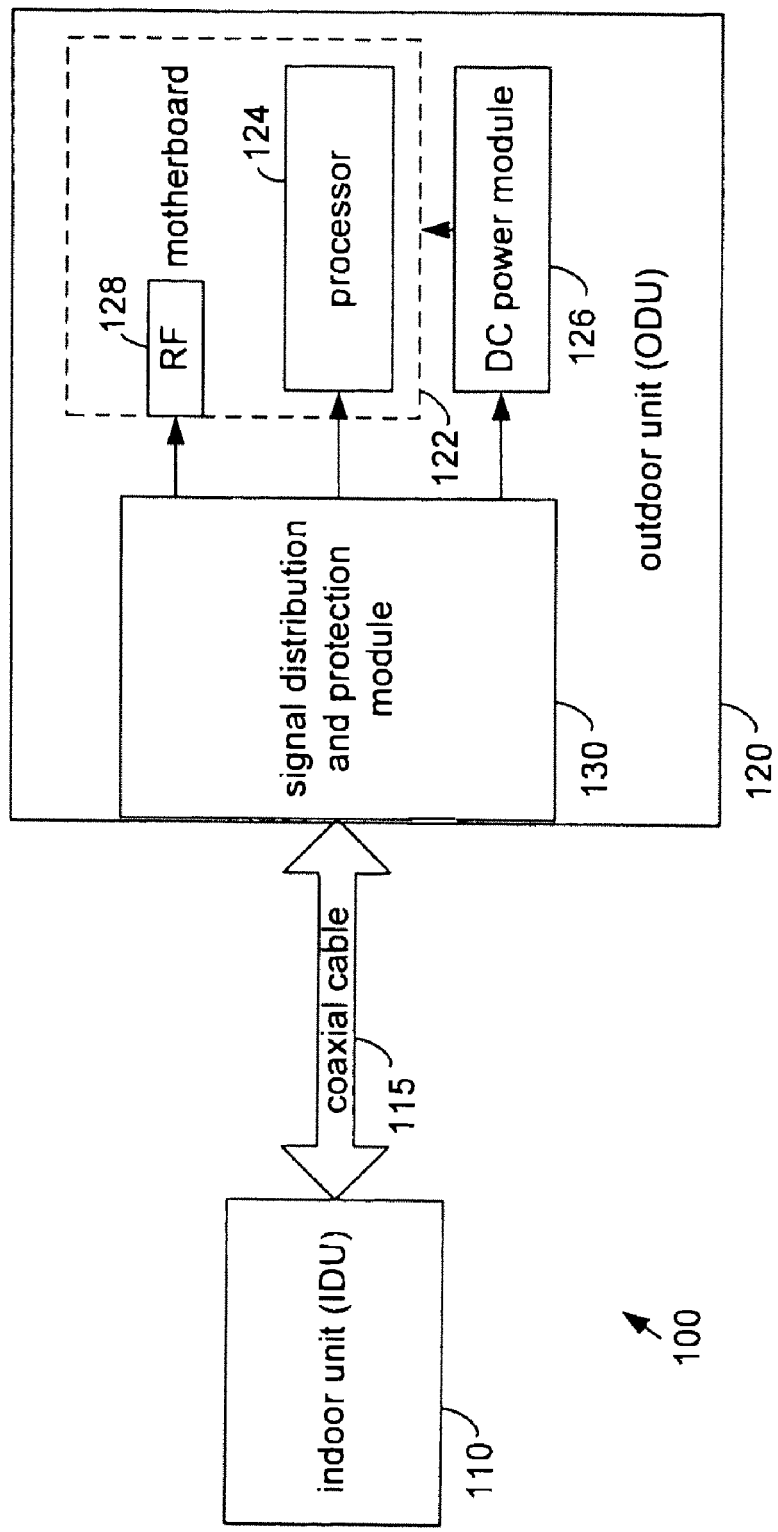
FIG. 1A is a block diagram of a split mount wireless radio system with a signal distribution and protection module according to one embodiment of the present invention.

FIG. 1A is a block diagram illustrating a split mount wireless radio system with a signal distribution and protection module (SDPM) according to one embodiment of the present invention. In this system, an indoor unit (IDU) 110 is coupled to an outdoor unit (ODU) 120 via a cable 115. The IDU 110 is coupled to a network (not shown) with which it communicates to receive and send data. Accordingly, the IDU has both transmit and receive paths. In the transmit path, the IDU 110 is configured to receive data from the network which it uses in modulating an RF signal using, e.g., QAM (quadrature amplitude modulation), to produces a modulated RF signal (which is often an IF signal). The IDU 110 supplies to the ODU 120 the modulated RF signal along with DC power. Thus, the cable 115 is preferably a coaxial cable designed for carrying a signal that includes both an RF component and a DC component. During a surge event, the cable 115 may carry the surge or transient impulse. In the receive path, the IDU 110 receives modulated signals (often intermediate frequency (IF) signals) from the ODU 120 and after demodulating them the IDU sends the data over the network.

In this embodiment, the ODU 120 includes a motherboard 122, a processor 124, and a DC power module 126. The motherboard 122 receives the modulated RF signals transmitted from the IDU 110 and in the transceiver module convert them to microwave or high frequency signals for transmission via an antenna. The processor 124 in the ODU is operative to control operations of the ODU including, preferably, processing and logging surge events. The processor 124 may be implemented as a processor module on a printed circuit board or an integrated circuit, or in other suitable configuration. Examples of integrated circuit processors may include a microcontroller, a microprocessor, an application specific integrated circuit (ASIC) and a field programmable gate array (FPGA).

Figure 1B:
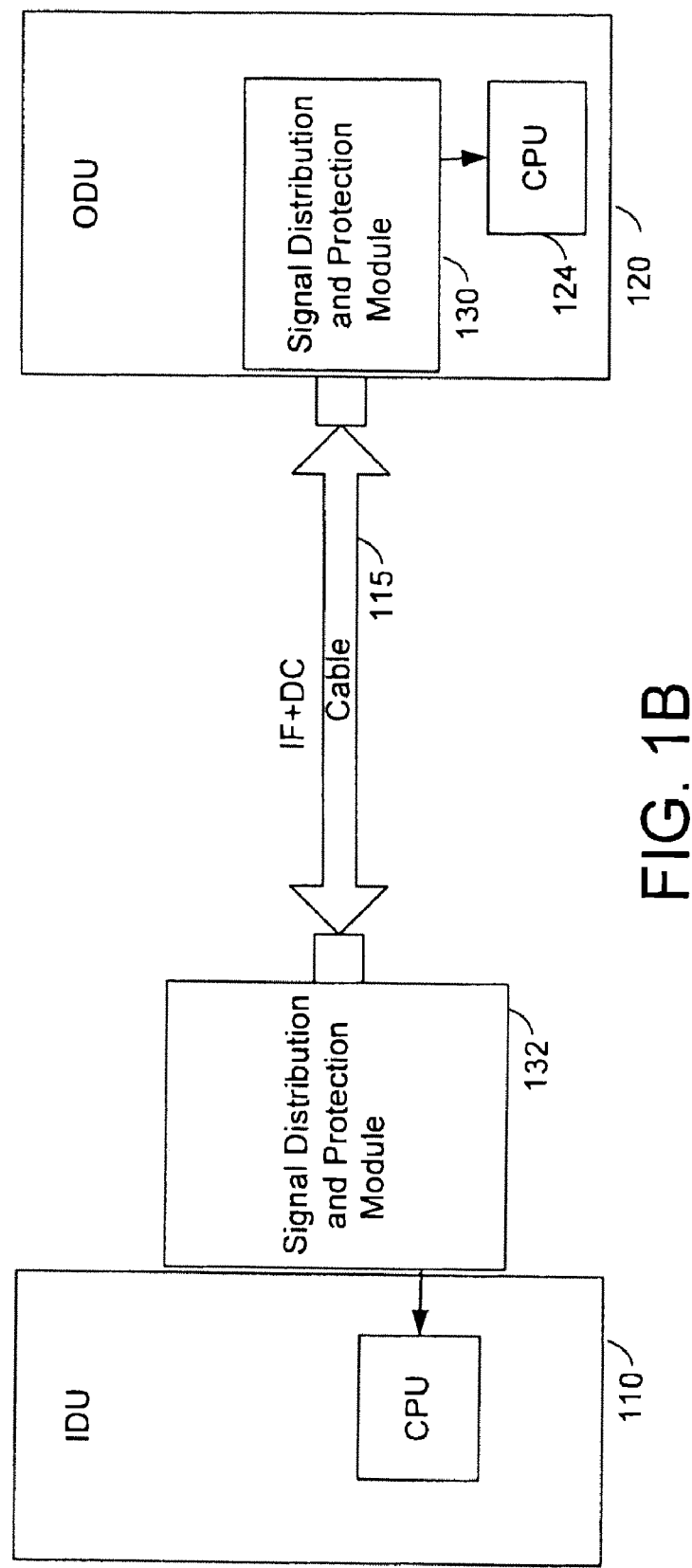
FIG. 1B is a block diagram of a split mount wireless radio system with two signal distribution and protection modules according to one embodiment of the present invention.

The ODU is preferably enclosed in a housing and an SDPM 130 is preferably also located within the housing of the ODU 120. In some system configurations the SDPM may be located externally to the housing. The block diagrams of FIG. 1A and FIG. 1B illustrate that wireless radio systems may have an SDPM at the ODU, IDU or both. Moreover, although embodiments of the SDPM 130 and 132 are shown here as used in wireless radio systems various embodiments of the SDPM may be used in systems other than wireless radio systems.

As further shown in FIG. 1A, the SDPM 130 distributes RF signals and DC signals received over cable 115 to the motherboard 122 and the DC power module 126, respectively; and it distributes received RF signals in the opposite direction over the cable 115 to the IDU 110. Additionally, the SDPM 130 detects and suppresses surges during surge events and provides indicia of such surge events to the processor 124. Examples of surge events that an SDPM may be configured to intercept include surge energy appearing on the cable connectors at the ODU or IDU and surge energy appearing at a service entrance to the IDU (or any other electronic equipment). Thus, in some wireless radio systems the IDU may also have an SDPM to intercept surge events, and an SDPM may be installed at the service entrance, the up-down cable connection, or both. In the illustrated embodiment, the SDPM 130 is located inside the ODU housing to intercept surge energy introduced at the cable 115 connection point to the ODU.

Figure 2:
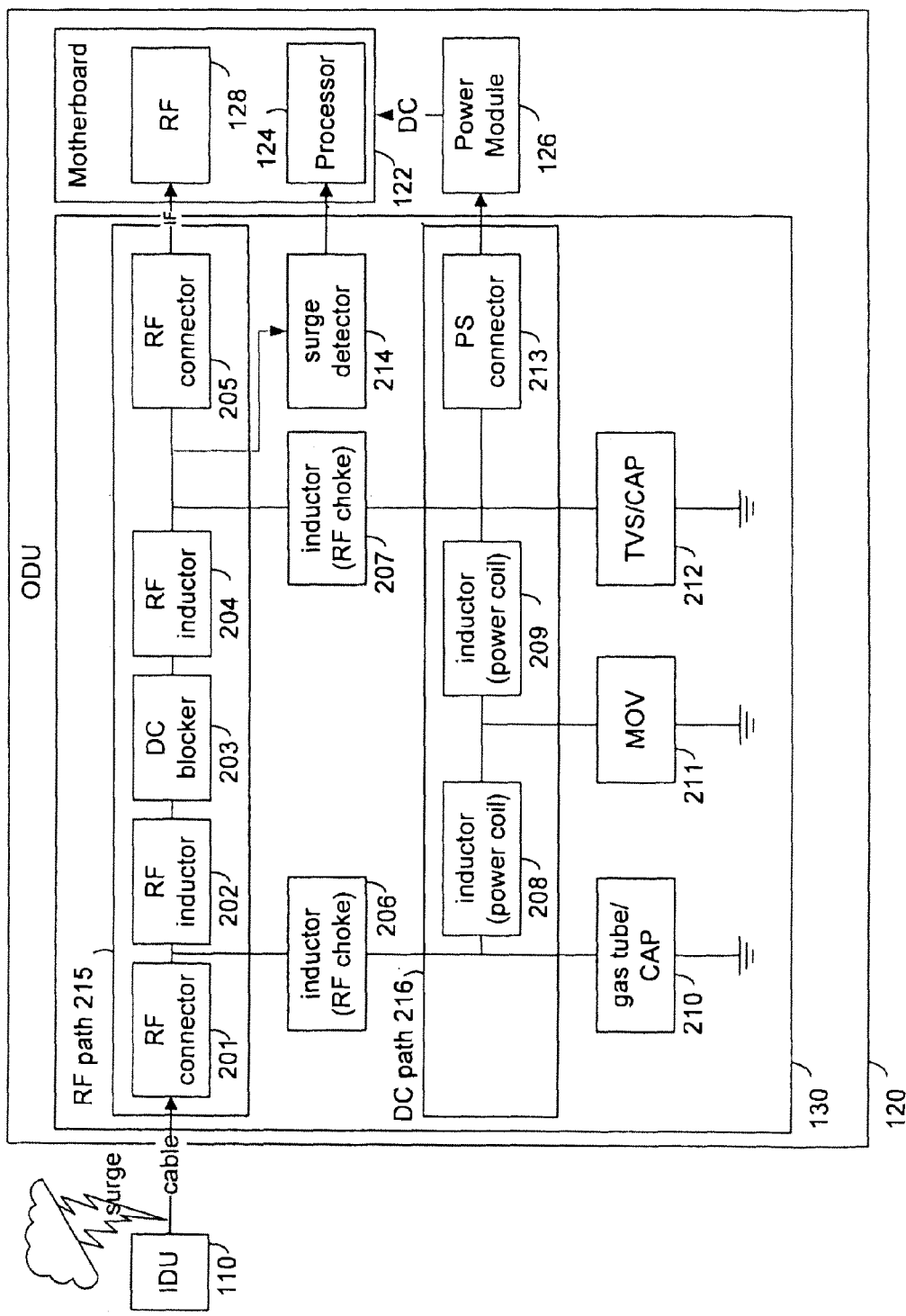
FIG. 2 is a block diagram of a signal distribution and protection module according to one embodiment of the present invention.

FIG. 2 is a block diagram of an SPDM 130 illustrating its functional components according to one embodiment of the invention. In this embodiment, an SDPM 130 comprises separate paths for the RF and DC signal components. The RF path 215 and DC path 216 are designed for signal distribution with proper electrical isolation between them to minimize interference. Two inductors, such as electromagnetic coils or RF chokes 206 and 207, inductively couple the RF path 215 and the DC path 216 in the SDPM 130. Additionally, the SDPM 130 includes a surge protection component and a surge detection and reporting component. Preferably, the surge protection component includes clamping devices 210, 211 and 212. The surge detection and reporting component includes a surge detector 214 operatively coupled to the RF path 215 and the processor 124.

The RF path 215 provides a path to and from the transceiver in the ODU for the modulated RF or non-DC components of the signals; and it provides a path for attenuated surge pulses. For modulated RF signals in a typical IF range the RF path 215 may include RF connectors 201 and 205 coupled through a DC blocker 203 that is connected at each side of an RF inductor 202 and 204. The RF inductors 202 and 204 provide respective RF matching to the RF connectors 201 and 205 in order to improve return loss. Such RF components can be designed for operation in an intermediate frequency range (IF; e.g., 50 MHz-450 MHz) or other operating frequencies of the non-DC signals. Moreover, depending on the return loss requirements and the SPDM physical layout, the inductors 202 and 204 may be altogether omitted from the RF path 215. Coupled between these RF inductors, the DC blocker 203, which may be a capacitor, blocks the DC power from encroaching on the RF signals path. The DC blocking capacitor can be designed to fit the desired frequency response. The RF inductors and capacitor 202, 203 and 204 form an RF matching network (with high-pass or band-pass characteristics) allowing RF signals to pass through with minimal insertion losses.

The aforementioned inductors 206 and 207 prevent the RF signal component from reaching the DC signal path 216, and thus may also be known as RF isolators or RF chokes. Specifically, in the illustrated SDPM 130, the first inductor 206, close to RF connector 201, allows the DC power and the surge energy into the DC path. In a different scenario an SDPM may be used, say in the IDU, at the cable connection point (as shown in FIG. 1B), at a power line connection point, or both.

Returning to FIG. 2, the second inductor 207 isolates DC path 216 from RF path 215 and to prevents lightning leakage voltage (from RF path 215) rise at RF connector 205 when a lightning surge event occurs. This is because the second inductor 207 shunts such voltage rise to ground via the TVS 212. It also provides a sampling path for suppressed low frequency components of a surge pulse from DC path 216 to surge detector 214.

As further shown in FIG. 2, the RF path includes also the surge detector 214 that is coupled to the RF connector 205. The surge detector 214 is adapted to receive attenuated surges from the RF path 215 and from DC path 216 and detect surge events. For example, an RF matching network tuned to IF frequency (e.g., 450 MHz) attenuates a 1 MHz lightning surge energy significantly but allows sufficient surge energy level for detection by the surge detector 214. In the case of power surge, the attenuated surge energy is provided via the second inductor 207. So, although an SDMP can be adapted to detect and protect against energy surges in various scenarios including the aforementioned lightning surge and power surge, in the ODU it is adapted to distribute IF signals and detect and protect against damage from lightning surge events. Accordingly, the surge detector 214 is further adapted to send indicia of such surge events to the processor 124 for logging and reporting them.

Inductively coupled to the RF path by the inductors 206 and 207, the DC path 216 provides a path for the DC power, as well as, for the surge energy that, as mentioned before, contains mostly DC and lower frequency energy. In the illustrated embodiment, the DC path 216 includes two inductors 208 and 209 and a power supply (PS) connector 213 that carries the DC power to the power module 126 in the ODU 120. The inductors, shown here as power coils 208 and 209, affect the time constant of surge or transient impulses and thus introduce a delay. The DC power can be provided through the power supply connector 213 as regulated or unregulated DC voltage (for example, −48V DC or −26V through −60V DC).

To suppress the surge energy, the surge protection component includes one or more clamping devices operatively coupled between the DC path 216 and ground. In this instance, there are three clamping devices including a gas tube 210, a metal oxide varistor (MOV) 211, and a transient voltage suppressor (TVS) 212. The surge protection device may further include capacitors in parallel with the clamping devices, to provide RF grounding. As shown in this example, a capacitor (CAP) is provided across the gas tube 210 and the TVS 212.

The gas tube 210 is a device that shorts when an applied voltage exceeds its rated clamping voltage. A typical gas tube includes a sealed chamber containing a gas that ionizes and allows current to flow to ground. The gas tube 210 may be a component which has a rated clamping voltage and nominal impulse discharge current. The MOV 211 is another device that shorts when an applied voltage exceeds its rated clamping voltage. Generally, the MOV 211 reacts more quickly to a surge or transient impulses than the gas tube 210, but can dissipate less power than gas tube 210. A typical MOV functions as a non-linear or variable resistor that exhibits a high resistance to ground for applied voltage that is below the rated clamping voltage and low resistance to ground for applied voltage that is at or above the rated clamping voltage. The MOV 211 may be a component, which has a maximum clamping voltage and a maximum peak impulse discharge current. The transient voltage suppressor (TVS) 212 may be a zener diode. For example, TVS 212 may be a component, which has a maximum clamping voltage and a maximum peak impulse current. Relative to the MOV 211 and gas tube 210, the TVS 212 reacts more quickly to a surge or transient impulse but can dissipate less power.

During normal operation, the RF signal component traverses the RF path 215 (formed in this embodiment by RF connector 201, RF inductor 202, DC blocker 203, RF inductor 204, and RF connector 205). The DC power signal component traverses a path including RF connector 201, inductor 206, and the DC path 216 (formed by inductors 208, inductor 209 and PS connector 213). When a surge event occurs, the surge energy (impulse) traverses a signal path formed by RF connector 201, inductor 206, inductor 208, inductor 209, gas tube 210, MOV 211, TVS 212, inductor 207, and surge detector 214. The clamping devices 210, 211 and 212 suppress the surge energy pulses in the DC path 216, diverting most of the surge energy to ground. Preferably, the clamping devices are arranged so that they encounter the various level of the propagating surge energy in a particular order. Gas tube 210 acts as the primary protector. MOV 211 acts as the secondary protector, and TVS 212 as the tertiary protection. These components must be separated by an isolating impedance that is inductive or resistive to ensure proper coordination of the protective devices. In most applications an inductive element is used to minimize power dissipation and voltage drop during normal operation. In a gas-tube arrestor, the low impedance of the arc after sparkover causes dissipation of most of the energy elsewhere, e.g. power-follow energy. A voltage-clamping suppressor, such as MOV, must absorb a large amount of transient surge energy. Its clamping action does not involve the power-follow energy resulting from a gas's short action. The sequence of events for the transient suppression is described below: (a) the TVS 212 clamps the leading edge of the transient to a value just above the rated operation voltage; (b) as the transient voltage continues to rise, it reaches the operating range of the MOV 211 with a peak current handling capability higher than the TVS; (c) as the current through the MOV increases, a voltage develops across the inductor 208, which causes the gas tube to fire, shunting the transient energy through the gas tube and away from the protected circuit; (d) gas tube remains in full condition for the duration of the transient; and (e) after the transient passes the gas tube extinguishes, ready for the next transient. This circuit uses each component to do what each does best: the gas tube diverts the high energy portion of the transient, the MOV provides intermediate power handling and protection of TVS, which accomplishes accurate clamping of the low energy leading edge.

Note that the surge protection component may include more than three clamping devices (e.g., four) or it may include fewer than three (e.g., two) depending on actual applications and protection requirements.

Figure 3:
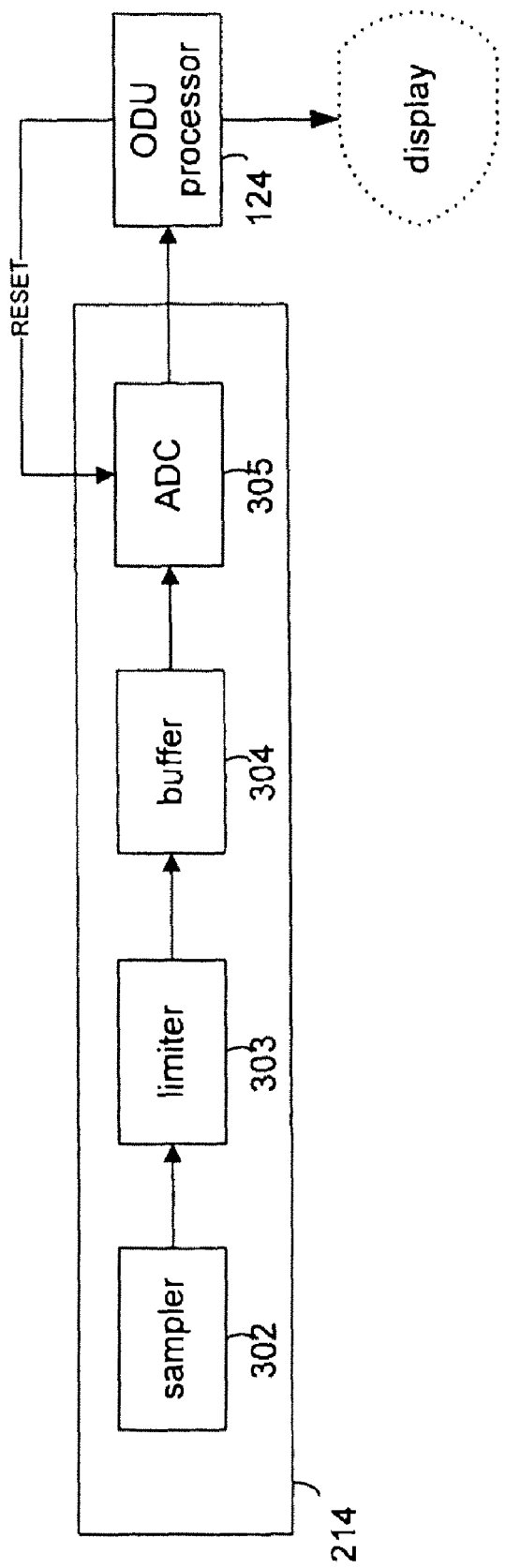
FIG. 3 is a block diagram of a surge detector according to one embodiment of the present invention.

For the purpose of detection and logging, whatever energy is left (not clamped) is sufficient for detection and is passed to the surge detection component 214. FIG. 3 is a block diagram illustrating a surge detection component according to one embodiment of the invention. In this embodiment, the surge detector 214 is at the ODU and includes a number of components connected in series. Specifically, it includes a sampler 302 that is coupled to a limiter 303 that is in turn coupled to a buffer 304. The buffer 304 is coupled to an analog-to-digital converter (ADC) 305 that is coupled to the processor 124.

The surge detector 214 is adapted to receive a signal from the RF path 215 (FIG. 2), and such RF signal may include an RF component and a surge energy component. The sampler 302 samples the surge energy component and provides the samples to limiter 303. The sampler 302 might be a resistive voltage divider or another suitable device. The limiter 303 limits the amplitude of the sampled surge energy pulses. The limiter 303 may be a full-wave or a half-wave clamping device such as a low power TVS diode configured to limit the voltage to a level below the breakdown voltage of the buffer. The buffer 304 isolates the ADC 305 from the limiter 303 and can also scale up or down the sampled surge energy pulse levels. ADC 305 provides an analog-to-digital conversion of the scaled, sampled surge pulses, providing digital values as indicia of a surge event to processor 124. A threshold is established inside ODU processor 124 to distinguish an incoming surge pulse and a "noise". Once the detected surge pulse level is over the threshold, the surge detecting and recording program is triggered and the surge event is logged. If the incoming pulse is below the threshold, the processor will recognize it as a low level "noise" and no event is recorded.

Figure 4:
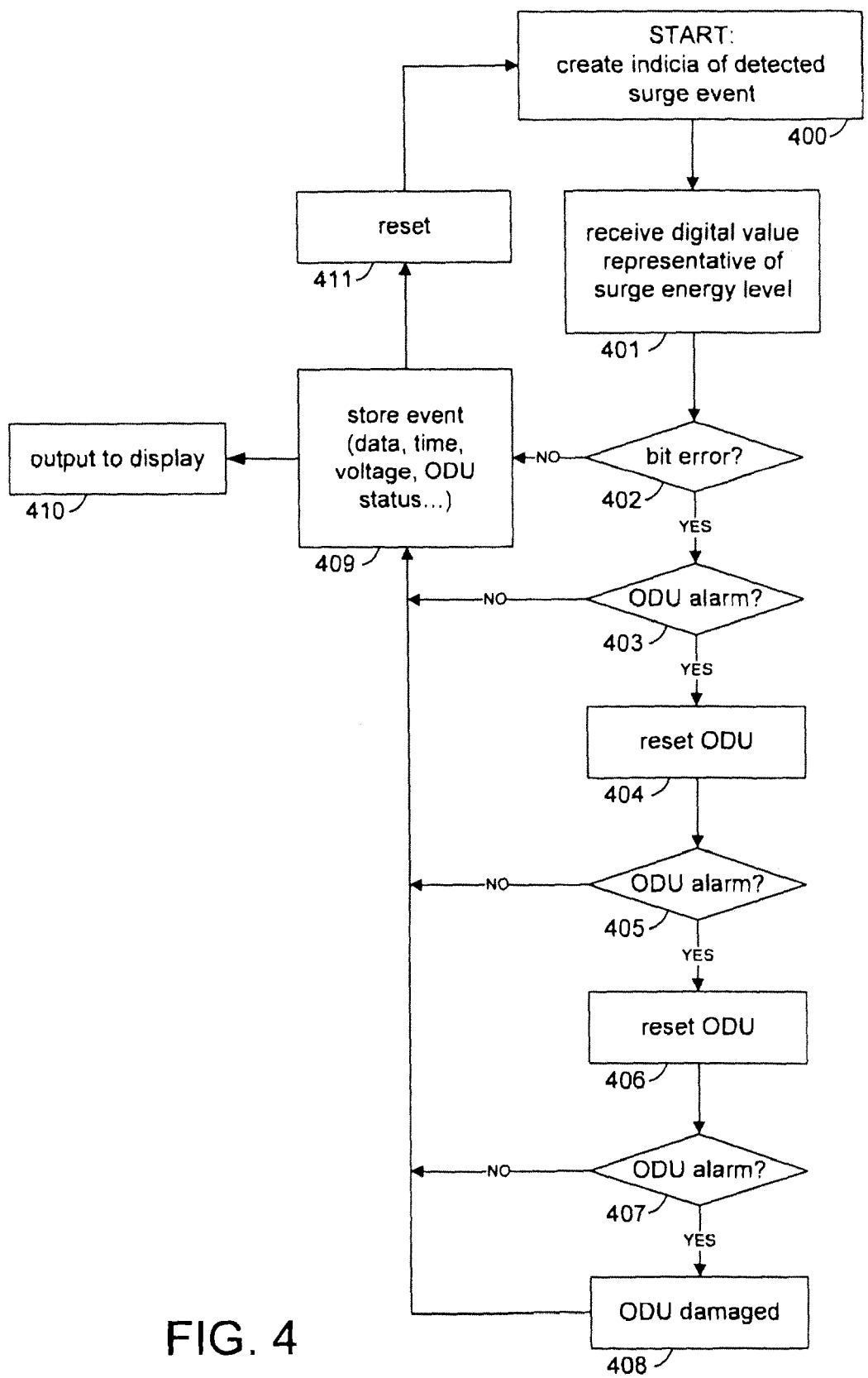
FIG. 4 is a flow diagram of a method for surge detection and recording according to one embodiment of the invention.

FIG. 4 is a flow diagram illustrating a method for detecting and recording surge events according to one embodiment of the present invention. According to this method, upon detecting a surge event in step 400, a processor receives from the surge detection component a digital value representative of the surge energy at step 401. The processor performs a check at step 402 to determine whether a bit error has occurred. If not, the surge event is logged at step 409. Logging the surge event may include storing a surge event identifier as well as a time associated with the surge event. If a bit error is detected at step 402, the processor performs a check at 403 to determine whether an ODU alarm has been triggered. If an ODU alarm has not been triggered, the surge event is logged at step 409. Otherwise, the processor resets the ODU at step 404. Following the reset, the processor performs a check at step 405 to determine whether an ODU alarm has been triggered. If not, the surge event is logged at step 409. Otherwise, the processor resets the ODU at step 406. Following the reset, the processor performs a check at step 407 to determine whether an ODU alarm has been triggered. If not, the surge event is logged at step 409. Otherwise, the processor determines at step 408 that the ODU has been damaged. The processor then logs the surge event at step 409. The processor outputs information associated with the logged surge event to a display (or it may output this information to a printer or send the information to another device, say over a network) at step 410. The processor then resets the surge detector at step 411. The detection and logging is provided in order to determine possible causes of a failure and who might be responsible for the repair.

In sum, the present invention contemplates various embodiments of a surge detection and protection module. While the invention has been described and illustrated in connection with a number of embodiments other embodiments are possible without departing from the spirit and scope of the invention. Accordingly, the scope of the invention as recited in the claims below should not be limited to the precise details of methodology or construction set forth above as variations and modification may also be included within the scope of the invention.

We claim:

1. A system for distributing signals and for detecting, suppressing and recording surge events, comprising:
    an RF (radio frequency) path;
    a DC (direct current) path inductively coupled to the RF path; and
    a surge protection and detection component including:
        a surge protection component with one or more clamping devices operatively linked between the DC path and ground, the surge protection component clamping surge energy associated with a surge event; and
        a surge detector operatively linked to the RF path from which the surge detector receives an attenuated surge energy associated with the surge event, the surge detector adapted to sample the attenuated surge energy, scale the samples, and provide indicia of the surge event, the indicia based on the scaled samples.

2. A system as in claim 1, wherein the RF path, DC path and surge protection and detection component are implemented together in a signal distribution and protection module (SDPM).

3. A system as in claim 2, wherein the SDPM is adapted to suppress, detect and provide the indicia of surge events resulting from lightning surges or power surges.

4. A system as in claim 1, wherein the indicia is in the form of digital information.

5. A system as in claim 1, further comprising a processor and a memory operatively connected for processing and logging the indicia from the surge detector.

6. A system as in claim 5, further comprising a display, recording or printing device operatively connected to the processor and adapted to receive from the processor information associated with the surge event.

7. A system as in claim 6, wherein the information represents logged surge events, current surge events or both.

8. A system as in claim 1, wherein the RF path includes a DC blocker.

9. A system according to claim 1, wherein the RF path includes an RF matching network with impedance matching inductors.

10. A system according to claim 8, wherein the RF path includes an RF matching network that includes the DC blocker connected at a first end to a first inductor and connected at a second end to a second inductor.

11. A system as in claim 1, wherein the RF path includes two RF connectors with an RF matching network interposed between them.

12. A system as in claim 1, wherein the DC path is inductively coupled to the RF path via an inductor adapted to allow DC and low-frequency signal components to reach the DC path and to prevent passage to the DC path of higher frequency components.

13. A system as in claim 12, wherein the RF path includes a DC blocker.

14. A system as in claim 1, wherein the surge detector is adapted to receive power surge energy and lightning surge energy.

15. A system as in claim 14, wherein the surge detector is adapted to receive power surge energy via the DC path and lightning surge energy via the RF path.

16. A system as in claim 1, wherein the one or more clamping devices includes any combination of a gas tube, a metal oxide varistor, and a zener or transient voltage suppressor (TVS) diode.

17. A system as in claim 1, wherein the surge protection component further includes one or more capacitors, each of which being connected to at least one of the clamping devices.

18. A system as in claim 1, wherein the DC path includes an inductor or a resistor interposed between two or more of the clamping devices.

19. A system as in claim 1, wherein the DC path includes two inductors connected to each other and at least one clamping device operatively coupled between the two inductors and ground.

20. A system as in claim 19 wherein the DC path includes a power supply connector connected to the inductors.

* * * * *